United States Patent
Kim et al.

(10) Patent No.: US 7,529,222 B2
(45) Date of Patent: May 5, 2009

(54) METHOD AND APPARATUS FOR MEDIUM ACCESS CONTROL FOR A DECENTRALIZED NETWORK WITH ADAPTED BEAMFORMING AND POWER CONTROL

(75) Inventors: Seung-Jun Kim, Piscataway, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 418 days.

(21) Appl. No.: 11/276,770

(22) Filed: Mar. 14, 2006

(65) Prior Publication Data

US 2007/0002734 A1 Jan. 4, 2007

Related U.S. Application Data (60) Provisional application No. 60/696,220, filed on Jul. 1, 2005.

(51) Int. Cl.
*H04B 7/22* (2006.01)
*H04W 72/00* (2006.01)

(52) U.S. Cl. ................ 370/348; 370/329; 370/345; 455/450; 455/452.2

(58) Field of Classification Search .......... 455/101, 455/562.1, 63, 450–453; 370/318, 338, 330, 370/347, 329; 342/367
See application file for complete search history.

(56) References Cited

OTHER PUBLICATIONS

Ochiai, H. et al., "Collaborative Beamforming for Distributed Wireless Ad Hoc Sensor Networks", IEEE Trans. on Signal Processing, vol. 53, issue 11, Nov. 2005.
Nandagopal, T. et al., "Achieving MAC Layer Fairness in Wireless Packet Networks", ACM MOBICOM'00, Boston, MA, Aug. 2000.
Elbatt, T. et al., "Joint Scheduling and Power Control for Wireless Ad-Hoc Networks", IEEE Proceedings of INFOCOM 2002.
Fahmy, N. et al., "Ad-Hoc Networks with Smart Antennas Using IEEE 802.11-Based Protocols", IEEE ICC'02, May 2002.
Ramanathan, R. et al., "Ad-Hoc Networking with Directional Antennas: A Complete System Sol'n", IEEE Journal on Selected Areas of Communication, vol. 23, issue 3, Mar. 2005.
Kim. S.-J., "Space-Time Synchronization and Beamforming for Wireless Communication", Ph.D. Dissertation, University of California, Santa Barbara, Jan. 2005.

*Primary Examiner*—Lester Kincaid
*Assistant Examiner*—Daniel Lai
(74) *Attorney, Agent, or Firm*—Joseph J. Kolodka

(57) ABSTRACT

A method and apparatus for medium access control in a wireless ad hoc network is disclosed that takes advantage of physical layer properties to jointly and collectively optimize in a distributed fashion transmission parameters such as beam-patterns and transmit powers of all active links in the network. To resolve signal transmission contention, each potential link is associated with a persistence parameter and the persistence parameter is adapted locally, with no central control, to provide medium access for transmissions. Where a node contending for a transmission slot is unable to optimize its transmission parameters due to an invalidity condition or infeasibility condition, the persistence parameter is updated, preferably so as to reduce the probability of such conditions.

12 Claims, 6 Drawing Sheets

```
For n = 1,2,...
    For each link i
        m <-- 1
        While ‖g_i(m+1) - g_i(m)‖ > ε
            Update normalized MVDR beamformer at node D(i)  ⎫
            w'_i(m+1) = R_i(P^n_i, g^n_i)^{-1} H_{D(i),S(i)} g_i(m)  ⎬  301
            w_i(m+1) <-- w'_i(m+1)/‖w'_i(m+1)‖              ⎪
            g̃_i(m+1) <-- w*_i(m+1)                          ⎭
            Transmit a packet to node l(i)-
            Update node S(i) beamformer.
            w̃'_i(m+1) = R̃_i(P̃^n_i, g̃^n_i)^{-1} H_{S(i),D(i)} g̃_i(m+1)  ⎫
            w̃_i(m+1) <-- w̃'_i(m+1)/‖w̃'_i(m+1)‖              ⎬  302
            g_i(m+1) <-- w̃*_i(m+1)                           ⎪
            m <-- m+1                                        ⎭
        End while
        m_i <-- m
        Update beamformer g^{n+1}_i <-- g_i(m_i), g̃^{n+1}_i <-- g̃_i(m_i)  ⎫
        Transmit estimated Γ_i from D(i) to S(i) and Γ̃_i from S(i) to D(i)  ⎬ 303
        Update power P^{n+1}_i <-- P^n_i γ_0/Γ_i, P̃^{n+1}_i <-- P̃^n_i γ_0/Γ̃_i  ⎭
    Next i
Next n
```

METHOD AND APPARATUS FOR MEDIUM ACCESS CONTROL FOR A DECENTRALIZED NETWORK WITH ADAPTED BEAMFORMING AND POWER CONTROL

This application claims the benefit of U.S. Provisional Application No. 60/696,220, filed Jul. 1, 2005, which is hereby incorporated herein by reference.

BACKGROUND OF THE INVENTION

The present invention relates generally to medium access control in communication networks.

Sensor networks are used in many different applications such as, for example, habitat monitoring, location tracking and inventory management. Such networks are typically characterized by hundreds or thousands of individual sensors located at sensor nodes distributed over a desired area. The sensors in a sensor network are typically able to communicate, for example via wired or wireless communications methods, to other sensors and one or more monitoring nodes in the network. Each sensor is able to detect at least one characteristic of its surroundings by obtaining appropriate measurements, such as acoustic, temperature, seismic, or other measurements, and may be able to perform simple computations related to those measurements. Then, at a predetermined schedule or in response to an ad hoc request from, for example, a monitoring node, the sensor transmits those measurements and computations to other nodes in the network, such as to the aforementioned monitoring node.

Sensor networks face significant energy constraints because, typically, sensors are spread over a wide area and are unattended. Accordingly, replacing batteries on the sensors may be cost and time prohibitive or even impossible. While such sensors have gained significantly in processing abilities, the amount of energy stored in sensor batteries has not gained to such an extent. Therefore, many advanced techniques for routing, communications, signal processing and hardware design have been used to help reduce the required transmit power and, hence, increase the life of batteries.

One such technique uses multiple cooperating antennas to increase the throughput and/or substantially reduce the transmit power of the communication system. Such techniques may be implemented, illustratively, using well-known Multiple Input, Multiple Output (MIMO) algorithms at the physical layer (PHY) of a network to exploit phenomena such as multipath propagation to increase throughput, or reduce bit error rates, rather than attempting to eliminate effects of multipath propagation distortion. Such techniques are useful to reduce the required transmit power for a signal.

A distributed sensor network can use such multi-antenna techniques by forming cooperating sensor clusters that function as virtual antenna arrays. However, system performance is dependent not only on algorithms at the physical layer, but also is dependent on the design of higher layers, such as at the medium access control (MAC) layer, as well as the interaction between different layers. Wireless medium access control (MAC) protocols used in wireless ad hoc networks, such as IEEE 802.11, are widely deployed but typically do not effectively consider advanced physical layer (PHY) technologies such as adaptive beamforming and power control. Some prior attempts have relied on non-adaptive directional antennas or independent beamforming by a single user, which is typically unable to sufficiently account for interference when the network is densely populated. On the other hand, other prior attempts have relied on centralized control for data transmission, which is only possible with increased network overhead due to the increased data traffic between network nodes and a central control node.

SUMMARY OF THE INVENTION

The present invention substantially solves the foregoing problems. In accordance with the principles of the present invention, physical layer properties are used jointly and collectively to optimize in a distributed fashion transmission parameters such as beam-patterns and transmit powers of all active links in the network. To resolve signal transmission contention, each potential link is associated with a persistence parameter and the persistence parameter is adapted locally, with no central control, to provide medium access for transmissions. Where a node contending for a transmission slot is unable to optimize its transmission parameters due to an invalidity condition or infeasibility condition, the persistence parameter is updated, preferably so as to reduce the probability of such conditions.

The medium access control technique disclosed herein, when utilized in conjunction with advanced physical-layer techniques for spatial reuse, advantageously facilitates enhanced throughput and a reduction in average transmit power, even with a small number of cooperating antennas. These and other advantages of the invention will be apparent to those of ordinary skill in the art by reference to the following detailed description and the accompanying drawings.

DETAILED DESCRIPTION OF THE INVENTION

Figure 1A:
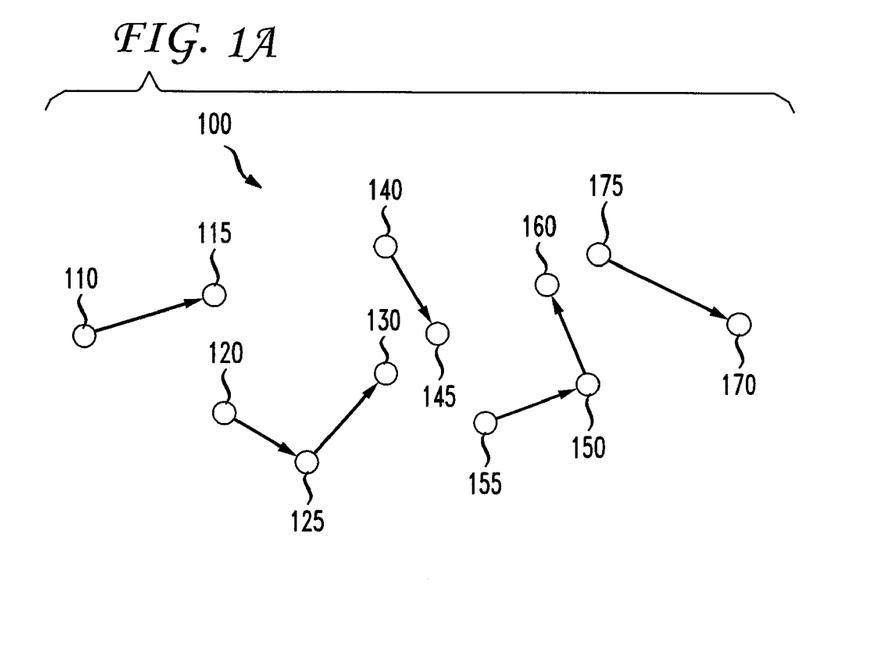
FIGS. 1A and 1B are diagrams illustrating a wireless communication network, suitable for implementing an embodiment of the present invention.

FIG. 1A is a diagram illustrating a wireless communication network 100 in accordance with one embodiment of the present invention. Wireless network 100 has, illustratively, a plurality of nodes 110-175, each having one or more wireless antennas. Nodes 110-175 illustratively have an array of multiple cooperating antennas so as to take advantage of multiple input, multiple output (MIMO) techniques, as discussed above. Each node is, for example and without limitation, a network of wireless sensors, such as that discussed above, which gather and transmit information in a distributed manner. A group of such sensors can be combined into one node to form a cooperating sensor cluster that functions as a virtual antenna array. Nodes 110-175 are illustratively arranged in an ad hoc network. As is well known, an ad hoc network is a network in which nodes directly discover and communicate in a peer-to-peer fashion without involving a central access point. In such a network, nodes 110-175 share information symbols to be transmitted and are capable of synchronizing their activities.

In order to communicate with one another, the nodes 110-175 of FIG. 1A may use the multiple antennas in those nodes to perform adaptive beamforming. As will be familiar to one skilled in the art, adaptive beamforming is a technique in which an array of antennas is able to achieve maximum reception in a specific angular direction by estimating the signal arrival from a desired direction (in the presence of noise) while signals of the same frequency from other directions are rejected. This is achieved by varying the weights of each of the sensors (antennas) used in the array. The spatial separation of arriving signals is exploited to separate the desired signal from the interfering signals. In adaptive beamforming the optimum weights of the antennas are typically iteratively computed. As is also known to one skilled in the art, beamforming is generally accomplished by phasing the feed to each element of an array so that signals received or transmitted from all elements will be in phase in a particular direction. For example, FIG. 1B, discussed further herein below, shows illustrative beam patterns for the network depicted in FIG. 1A. Such adaptive beamforming using an advantageous algorithm in accordance with an embodiment of the present invention is also discussed further herein below.

Figure 1B:
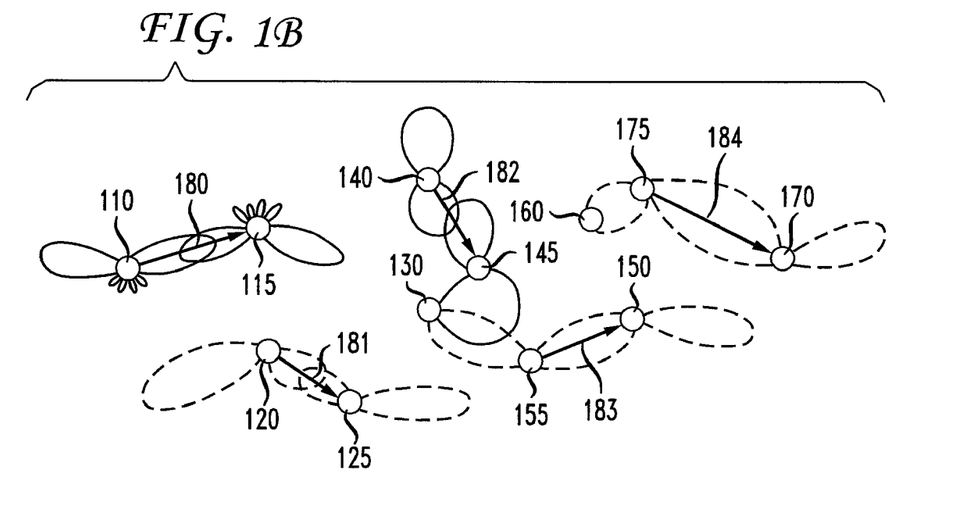
Figure 2:
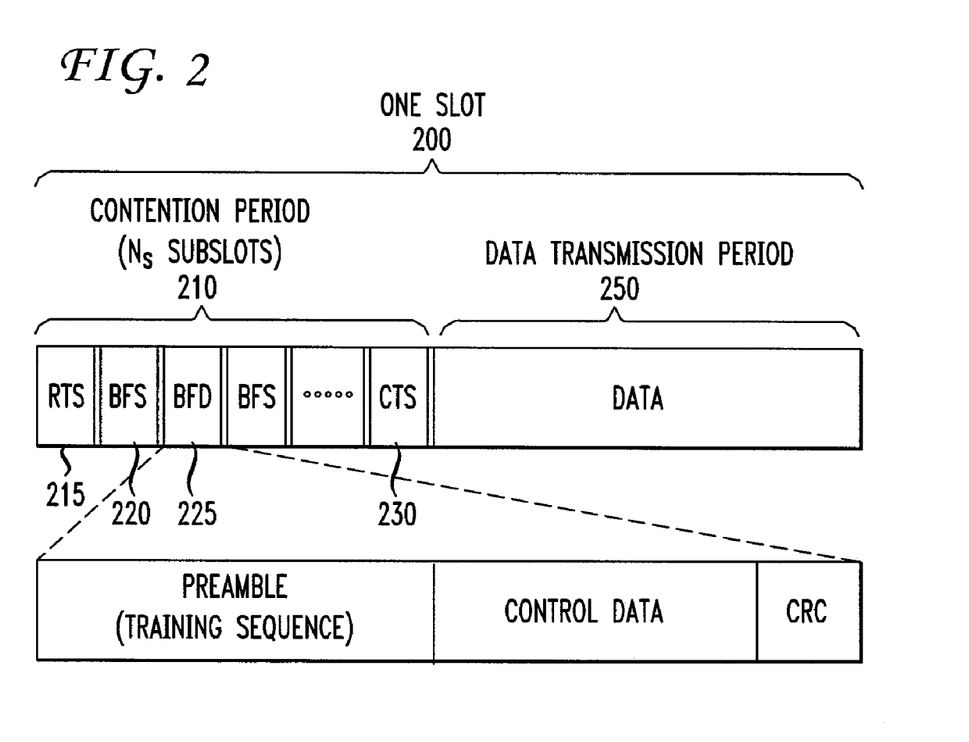
FIG. 2 illustrates the slot structure of a medium access control method in accordance with an embodiment of the invention.
Figure 3:
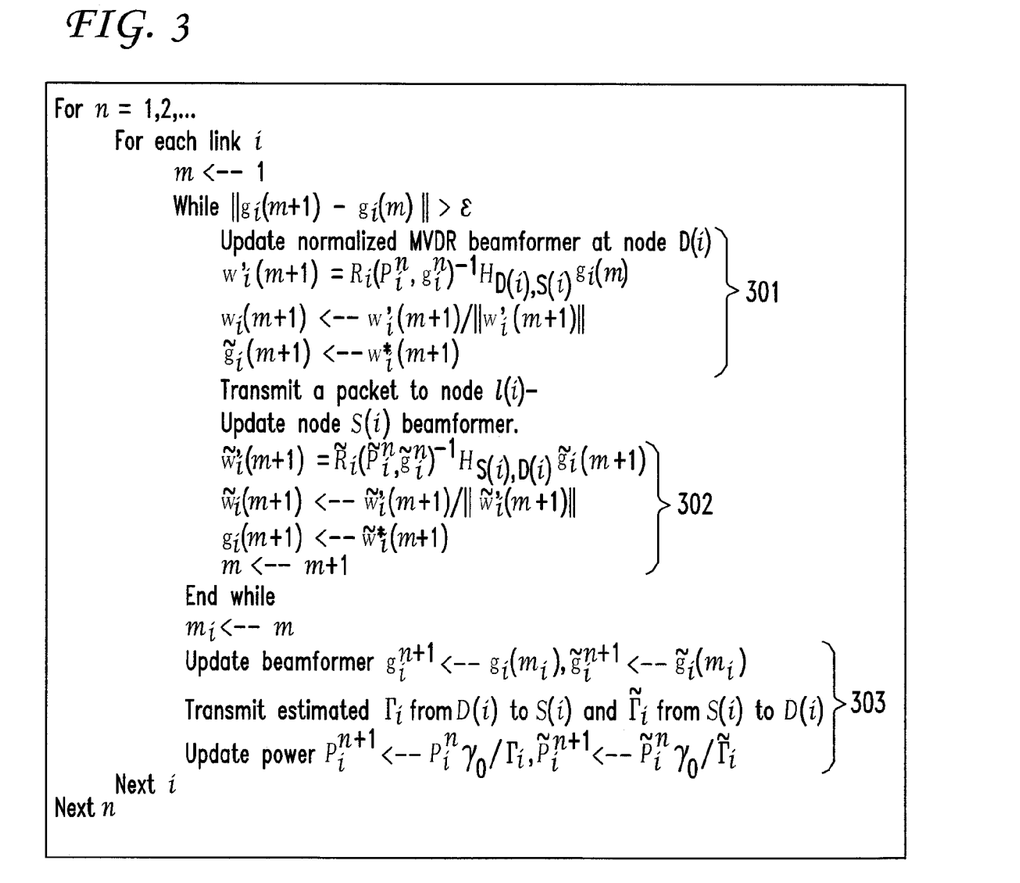
FIG. 3 is pseudo-code illustrating Iterative Minimum Mean Square Error distributed beamforming.

FIG. 2 shows one illustrative embodiment of how nodes 110-175 of FIGS. 1A and 1B use medium access control to transmit data. Specifically, referring to FIG. 2, access to the wireless transmission medium is provided using transmission slots. Different transmissions from different users (e.g., different sensor nodes) are multiplexed onto the transmission medium using those slots. As one skilled in the art will recognize, the type of transmission slot will depend on the particular multiplexing technique utilized, e.g., the transmission slot would represent a time slot if a time division multiplexing technique is utilized. In FIG. 2, each transmission slot 200 is subdivided into a contention resolution period 210 and a data transmission period 250. During the contention resolution period 210, in accordance with one embodiment of the present invention, the nodes in the network jointly and cooperatively determine advantageous physical layer (PHY) beamforming and power control parameters. One advantageous method useful in performing such beamforming/power control functions during contention period 210 is the Iterative Minimum Mean Square Error (IMMSE) method, which is shown in FIG. 3 and described below, and which is further described in greater detail in S.-J. Kim, "Space-Time Synchronization and Beamforming for Wireless Communication," Ph.D. Dissertation, University of California, Santa Barbara (January 2005), which is hereby incorporated by reference herein in its entirety. One skilled in the art will recognize, however, that the present invention is not limited to any specific beamforming/power control technique and that any such suitable technique may be used with equally advantageous results. During contention period 210, using a beamforming/power control technique allows each node to adaptively compute transmit and receive beamforming parameters using only local information while minimizing the transmit power under a signal quality constraint represented by a target signal to interference and noise ratio (SINR). Since such a method can jointly determine the set of beamforming parameters and powers for all links in the network, spatial reuse of the network can illustratively be maximized during contention period 210 and, as a result, the transmit power required by the network can be minimized.

As discussed above, in accordance with the principles of the present invention, a method for determining beamforming and power control parameters can be used during contention period 210 of a medium access control process to optimize the links in a network. As also discussed above, FIG. 3 shows such a method. Specifically, referring to FIG. 3, in a wireless sensor network there are illustratively N links for which data transmission requires scheduling. For each link i, where i=1, 2, . . . , N, the source and the destination nodes are denoted by S(i) and D(i), respectively. Although the number of antennas as mentioned above can vary depending on the node, for convenience of discussion, assume that each node has M antenna elements. The MIMO channel is assumed without limitation to be flat (i.e., frequency non-selective) and represented by an M-by-M complex matrix $H_{D(i),S(i)}$. Then, the received signal at node D(i) can be represented by an M-vector:

$$Y_{D(i)} = \sqrt{P_i} H_{D(i),S(i)} g_i b_i + \sum_{j=1,j\neq i}^{N} P_j H_{D(j),S(j)} g_j b_j + n_{D(i)} \qquad \text{Equation 1}$$

where $P_i$ is the transmit power; $g_i$ is the unit-norm transmit beamforming weight; $b_i$ is the transmitted symbol with $E|b_i|^2=1$ for each link i; and $n_{D(i)}$ is the additive thermal noise whose covariance is normalized to an identity matrix. Assuming a unit-norm receive beamforming weight $w_i$ is used at node D(i), the received SINR for link i may be expressed as:

$$\Gamma_i = \frac{P_i |w_i^H H_{D(i),S(i)} g_i|^2}{\sum_{j=1,j\neq i}^{N} P_j |w_i^H H_{D(j),S(j)} g_j|^2 b_j + 1} \qquad \text{Equation 2}$$

The network-wide optimization problem is then given by:

$$\min_{\substack{w_i, g_i, P_i \\ i=1,2,\ldots,N}} \sum_{i=1}^{N} P_i \qquad \text{Equation 3}$$

subject to $$\Gamma_i \geq \gamma_0, \, i = 1, 2, \ldots, N$$

where $\gamma_0$ is the target SINR which is (for convenience) assumed to be equal for all links. The optimal receive beamforming weight w, therefore, is the minimum variance distortionless-response (MVDR) beamforming weight calculated and updated at steps 301 in FIG. 3 and is given by:

$$w_i = \frac{1}{c} R_i^{-1} H_{D(i),S(i)} g_i \qquad \text{Equation 4}$$

where c is a normalization constant and the covariance matrix $R_i$ is given by:

$$R_i = \sum_{j=1,j\neq i}^{N} P_j H_{D(i),S(j)} g_j g_j^H H_{D(i),S(j)}^H + I \qquad \text{Equation 5}$$

where the variables are as defined above and I is the identity matrix, as is also discussed above.

To compute the transmit beamforming weight, in accordance with an embodiment of the present invention, at steps 302 an iterative procedure can be used based on the reciprocity of the channel represented as $H_{d,s}=H_{s,d}^T$. For example, the algorithm of FIG. 3 can be used for such purposes where each link maximizes the normalized SINR (which is defined as $\Gamma_i/P_i$ for link i) while taking into account the interference that the link generates to other links.

Referring once again to FIG. 1B, that figure shows, for example, illustrative beam patterns for the network depicted in FIG. 1A generated by the beamforming procedure of FIG. 3 where, illustratively, five links 180-184 are scheduled and each node has an array of four antennas. In accordance with one embodiment of the present invention, there is no central control and, therefore, the decision of which links to participate in each array is determined in a distributed manner using only local information. Specifically, in accordance with an embodiment of the present invention, link i can participate in the contention only with probability $r_i$, where i=1,2, ..., N. These probabilities $r_i$, also referred to herein as persistence parameters, are updated locally. More particularly, let C be the set of links participating in the procedure of FIG. 3. Referring once again to FIG. 2, during the contention resolution period 210, the source nodes S(i), where i∈C, first send out short Request-To-Send (RTS) messages 215. For fast convergence of the algorithm of FIG. 3, the source nodes can use the beamforming weights $w_i$ discussed above that may be, illustratively, stored in a cache at each source node. Depending on the time elapsed since the last successful transmission and the speed of the channel variation, there may be no such weights stored at a particular source node. In such a case, the transmission of the RTS message may be accomplished without beamforming, i.e., an omnidirectional transmission can be used. The RTS message 215 contains, illustratively, a training sequence unique to the destination node so that the intended recipient of the message can use a training sequence to direct its beamformer toward the source node. The training sequences can be chosen, for example, from a set of low cross-correlation sequences such as well-known Gold codes or, illustratively, from a set of phase-shifted versions of a low auto-correlation pseudorandom (PN) sequence, such as m-sequences, which are also well-known to one skilled in the art. The RTS message 215 preferably also contains the address of node S(i) and cyclic redundancy check (CRC) bits.

Upon reception of the RTS messages 215, each destination node D(i), where i∈C, replies with a Beamforming-at-Source (BFS) message 220 using the beamforming weights equal to the complex conjugate of the receive beamformers. The BFS message 220 contains a training sequence specific to the source node S(i) as well as a power control command to meet the target SINR at D(i). The source nodes then update their beamformer weights $w_i$ and transmit powers, if necessary, and proceed to transmit Beamforming-at-Destination (BFD) messages 225 as shown at steps 303 in FIG. 3. This process is iterated $N_s-1$ times, i.e., until $N_s-1$ BFS and BFD transmissions occur, where Ns is the number of available transmission slots. After this iterative process, the destination nodes that have an SINR that meets the target SINR level will transmit a Clear-To-Send (CTS) message 230. The source links for which CTS message 230 is issued can then transmit data during the data transmission period 250.

During the data transmission period 250, a set A of active users, i.e., a set of links that have packets to transmit, exists. The set A is said to be valid if the following conditions are satisfied:

1. A node does not transmit and receive at the same time: $S(i) \neq D(j)$ for all i, j∈A, i≠j;

2. A node does not receive from multiple nodes at the same time: $S(i) \neq S(j)$ for all i, j∈A, i≠j; and 3. A node does not transmit to multiple nodes at the same time: $D(i) \neq D(j)$ for all i, j∈A, i≠j.

As one skilled in the art will recognize, condition 1 is derived as a function of typical radio limitations. Conditions 2 and 3 are imposed to simplify the design of the radio and the MAC protocol. Complexity permitting, one skilled in the art will recognize that these two conditions can be relieved to yield an even higher data throughput.

A valid set of links is considered to be feasible if all links in the set can achieve a desired SINR level and if appropriate transmission parameters that achieve the given target SINR level can be found, for example, by performing the IMMSE procedure in FIG. 3. Otherwise, the set, even if valid, is rejected as infeasible. As one skilled in the art will recognize, such an inability to reach a desired SINR level may be caused by interference among different signals and, therefore, proper scheduling is necessary to help insure that valid sets of links are also feasible. In particular, by insuring that only one specific link in a contention region is capable of transmitting or receiving, interference can be minimized.

Figure 4A:
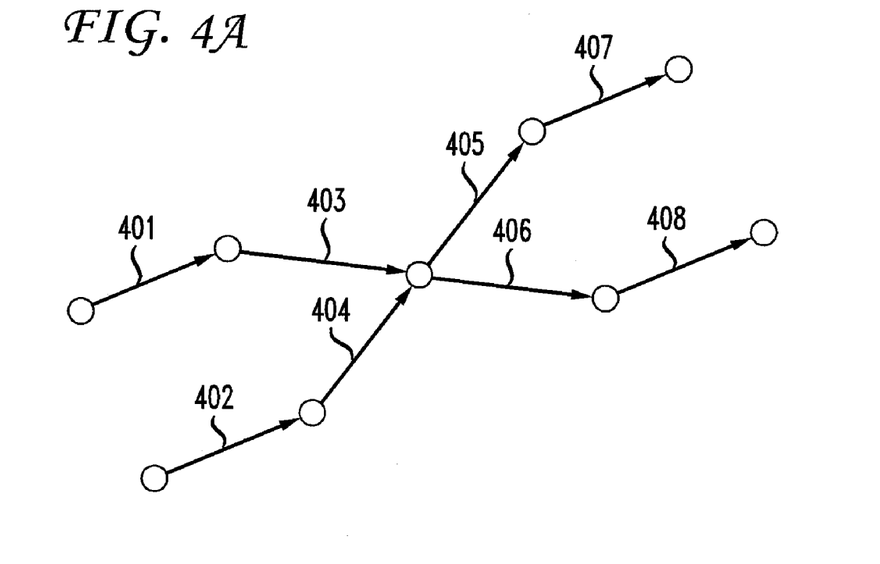
FIGS. 4A and 4B are diagrams illustrating examples of sets of active links.
Figure 4B:
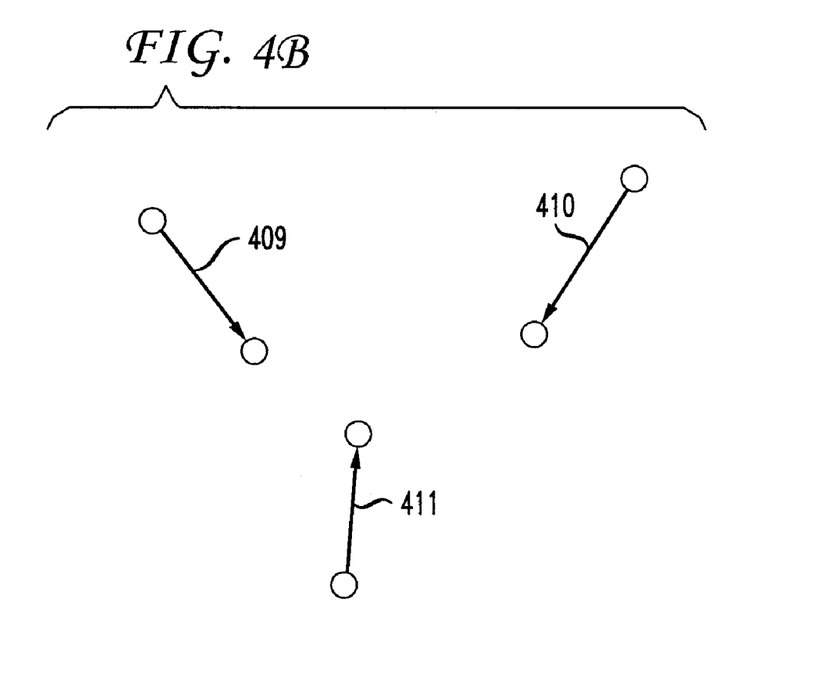

FIG. 4A shows an example topology of active links that require scheduling. Due to conditions 1-3 discussed above, for example, only one link among links {403, 404, 405, 406} can be scheduled in the same slot, and thus this set is said to be a contention region (i.e., those links will be contending for transmission slots). Similarly, the sets of links {401, 403}, {402, 404}, {405, 407}, and {406, 408} are also contention regions. However, contention regions may not be easily identified due to the accumulated interference from multiple links. To see this, consider the topology depicted in FIG. 4B. Assume that the set of feasible link sets for this particular topology is {{409}, {410}, {411}, {409, 410}, {410, 411}, {411, 409}}. As one skilled in the art will recognize, the contention region cannot be defined in this case. Specifically, as discussed above, the term contention region refers to a region in which no more than one link can be scheduled at a given time. However, in the topology of FIG. 4B, it may be possible to schedule two or more of the links at the same time.

Thus, the present inventors have recognized that it is desirable to treat all links in the network as an "extended" contention region in which only a certain set of links are permitted simultaneous transmission. Specifically, the present inventors have recognized that the problem of infeasibility may advantageously be addressed by minimizing traffic collisions over the entire network. Therefore, in accordance with another embodiment of the present invention, a utility function for link i, i=1,2, ..., N can be defined as:

$$U_i(r_i) = \begin{cases} w_i \dfrac{r_i^{1-\alpha}}{1-\alpha} & \alpha > 0 \\ w_i \log r_i & \alpha = 1 \end{cases} \quad \text{Equation 6}$$

where $U_i(\cdot)$ is a continuously differentiable, strictly concave, increasing function; $r_i$ is the probability of successful medium access of link i; and $w_i$ corresponds to the beamforming weight associated with link i with $w_i>0$. The set of all valid link sets is denoted as v and the set of all feasible link sets is denoted as $\mathfrak{F}$. Thus, the objective function that the network must maximize is defined by:

$$T(r) = \sum_{i=1}^{N} U_i(r_i) - \beta_1 P_1(r) - \beta_2 P_2(r) \quad \text{Equation 7}$$

where $$P_1(r) = \sum_{c \in C} \int_0^{\sum_{j \in c} r_j} \frac{(u-1)^+}{u} du \quad \text{Equation 8}$$

and $$P_2(r) = \sum_{k \in v\bar{v}} \prod_{j \in k} r_j \quad \text{Equation 9}$$

and where r is the vector of $r_i$'s; $\beta_1$ and $\beta_2$ are nonnegative constants; C is the set of contention regions due to the validity check, discussed above; $(\bullet)^+$ equivalent to $\max\{0,\bullet\}$; and the other variables are as described above. Equation 7 includes terms that apply a penalty to the probability of transmission based on the existence of either an invalidity condition or an infeasibility condition. Specifically, the first term in equation 7 is the aggregate utility of the network where $P_1(r)$ represents the penalty due to the appearance of an invalid link set and $P_2(r)$ corresponds to the penalty due to the infeasible link set. Therefore, maximizing $T(r)$ balances (via constants $\beta_1$ and $\beta_2$) the aggregate throughput and the excess of resources resulting from an undesirable set of links being present in the contention period.

It should be mentioned that $T(r)$ is not concave since $P_2(r)$ is not convex (nor concave). Thus, $T(r)$ can possibly have multiple local optimal values. However, a non-cooperative game can be formulated whose Nash equilibriums correspond to the local optimal values, and a decentralized update rule can be derived that converges to one of the Nash equilibriums. One skilled in the art will recognize that a Nash equilibrium is an equilibrium in game theory in which, applied to this case, during the contention phase of the medium access control process described here, each link's probability of transmission is optimal given the probabilities of the other links. Specifically, such a decentralized update rule can be derived via a non-cooperative game where link i unilaterally maximizes the objective function given by:

$$J_i(r_i) = \quad \text{Equation 10}$$

$$U_i(r_i) - \beta_1 \sum_{c \in C, i \in c} \int_0^{\sum_{j \in c} r_j} \frac{(u-1)^+}{u} du - \beta_2 \sum_{k \in v\bar{v}, i \in k} \prod_{j \in k} r_j.$$

where the variables are as described herein above. With $r_j$ fixed and $j \neq i$, $J_i(r_i)$ is maximized when:

$$\frac{dJ_i}{dr_i} = \quad \text{Equation 11}$$

$$U_i'(r_i) - \beta_1 \sum_{c \in C, i \in c} \frac{\left(\sum_{j \in c} r_j - 1\right)^+}{\sum_{j \in c} r_j} - \beta_2 \sum_{k \in v\bar{v}, i \in k} \prod_{j \in k, j \neq i} r_j = 0.$$

One skilled in the art will recognize that Equation 11 represents the set of first order necessary conditions of optimality of maximizing $T(r)$ and, therefore, a Nash equilibrium exists for the non-cooperative game, as specified by Equation 10. Moreover, the distributed update rule for $r_i$ can be given by:

$$\frac{dr_i(t)}{dt} = w_i - (r_i(t))^\alpha \left[ \begin{array}{c} \beta_1 \sum_{c \in C, i \in C} \frac{\left(\sum_{j \in c} r_j(t) - 1\right)^+}{\sum_{j \in c} r_j(t)} - \\ \beta_2 \sum_{k \in v\bar{v}, i \in k} \prod_{j \in k, j \neq i} r_j(t) \end{array} \right] \quad \text{Equation 12}$$

in which $U_i(r_i)$ was replaced by Equation 6 where the Nash equilibrium is the stable point of the update rule, at which point:

$$\frac{dT(r)}{dt} = \quad \text{Equation 13}$$

$$\sum_{i=1}^{N} \frac{1}{r_i^\alpha} \left( w_i - r_i^\alpha \left[ \begin{array}{c} \beta_1 \sum_{c \in C, i \in C} \frac{\left(\sum_{j \in c} r_j - 1\right)^+}{\sum_{j \in c} r_j} + \\ \beta_2 \sum_{k \in v\bar{v}, i \in k} \prod_{j \in k, j \neq i} r_j(t) \end{array} \right] \right)^2 \geq 0.$$

Thus, as one skilled in the art will recognize, according to Equation 13, $T(r)$ guarantees the convergence of the system.

To implement the foregoing update rule it is assumed that the term $$P_{inv}^i \triangleq \sum_{c \in C, i \in C} \frac{\left(\sum_{j \in c} r_j - 1\right)^+}{\sum_{j \in c} r_j}$$

approximates the probability that the given transmission set containing link i is invalid, assuming $r_i$ are small. Under the same assumption, the term $$P_{inf}^i|i \triangleq \sum_{k \in v\bar{v}, i \in k} \prod_{j \in k, j \neq i} r_j$$

approximates the conditional probability of the given transmission set being valid yet infeasible. The exact expression would, therefore, be:

$$P_{inf,exact}^i|i = \sum_{k \in v\bar{v}, i \in k} \prod_{j \in k, j \neq i} r_j \prod_{j \notin k} (1 - r_j). \quad \text{Equation 14}$$

Therefore, the update Equation 12 can be re-written as:

$$r_i(t+1) = r_i(t) + w_i - \beta_1 (r_i(t))^\alpha P_{inv}^i - \beta_2 (r_i(t))^{\alpha-1} P_{inf}^i, \quad \text{Equation 15}$$

where $P_{inf}^i = r_i P_{inf}^i|i$. We assume that each node can detect the violation of conditions 1 and 2 in the contention period and that condition 3 is satisfied in practice by the transmitting node that can make a scheduling decision for the outgoing links. The detection of the infeasible case can be accomplished, for example, by measuring the final SINR level due to the CTS message packets. If the SINR level is not equal to the target SINR level, the nodes can determine that an infeasible case has occurred.

Figure 5:
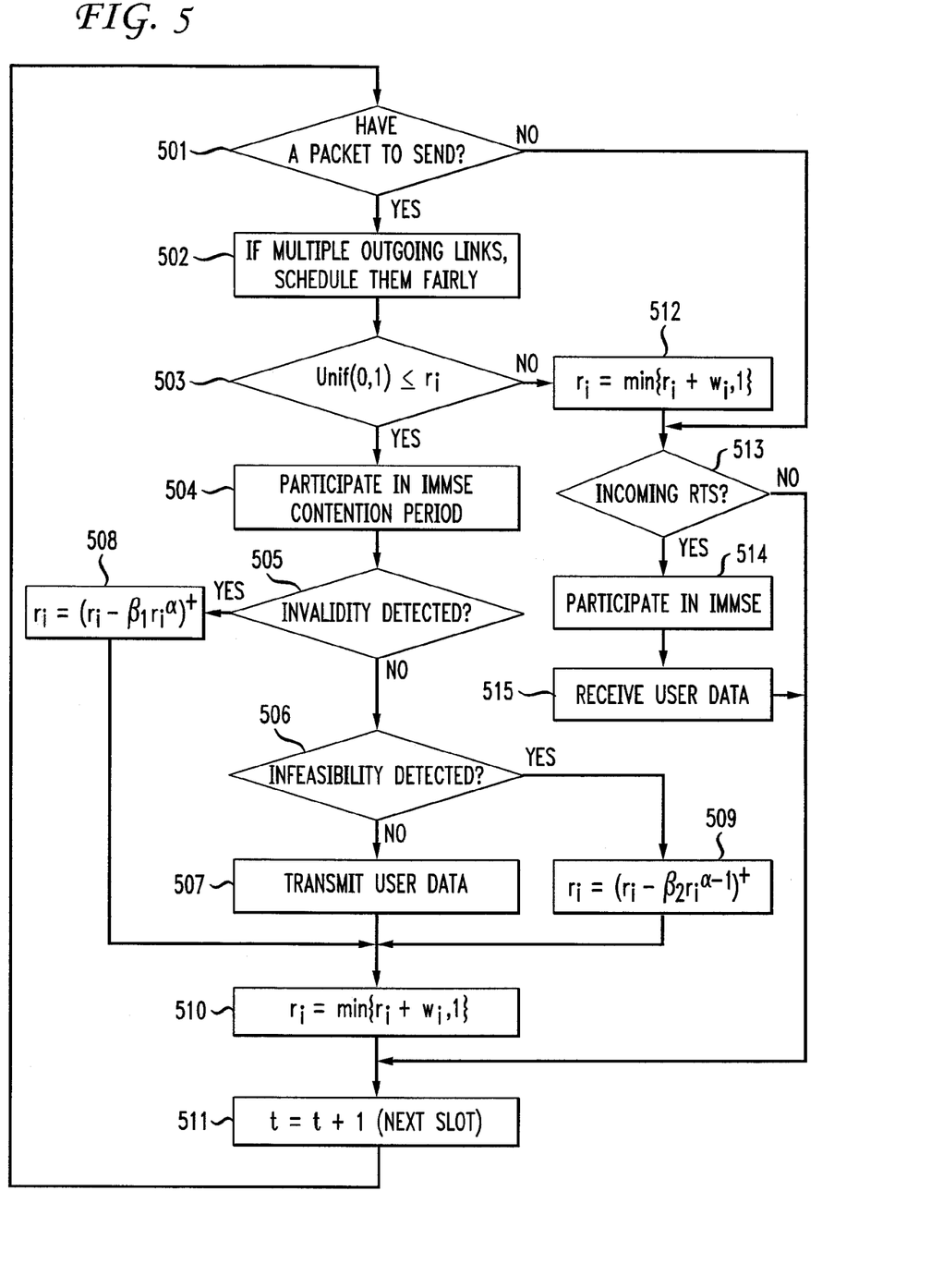
FIG. 5 is a flowchart of the processing performed by the nodes in the network in accordance with a medium access control arrangement in accordance with an embodiment of the present invention.

FIG. 5 is a flowchart of the processing performed by each node in the network. At step 501, it is determined whether the node has any information to transmit. If so, and if the node has multiple outgoing links, then, at step 502, the node performs local scheduling to schedule the multiple outgoing links. Then, at step 503, the node decides whether it will contend for a transmission slot. As discussed above, this decision is made in accordance with the persistence parameter, $r_i$. If the node does decide to participate in the contention period, then at step 504, the node commences computations in accordance with the physical-layer IMMSE procedure, discussed above and shown in FIG. 3. If an invalidity condition is detected at step 505, then the node updates the persistence parameter at step 508 and proceeds without transmitting. If an infeasibility condition is detected at step 506, then the node updates the persistence parameter at step 509 and again proceeds without transmitting. Otherwise, the node transmits at step 507 using the optimized beam pattern and power settings. The persistence parameter is updated at step 510, and the node moves on to the next transmission slot at step 511.

If the node decides not to contend for the transmission slot at step 503, then the node updates the persistence parameter at step 512. The node then checks at step 513 whether it has received an RTS message and is designated as a receiving node for any links to be scheduled this transmission slot. If it is designated as such a receiving node, then the node participates at step 514 in the IMMSE procedure of FIG. 3 and proceeds to receive the transmission at 515. Similarly, if the node has no information to transmit at step 501, the node can proceed with the check at step 513 and participate in the IMMSE procedure if necessary.

Figure 6:
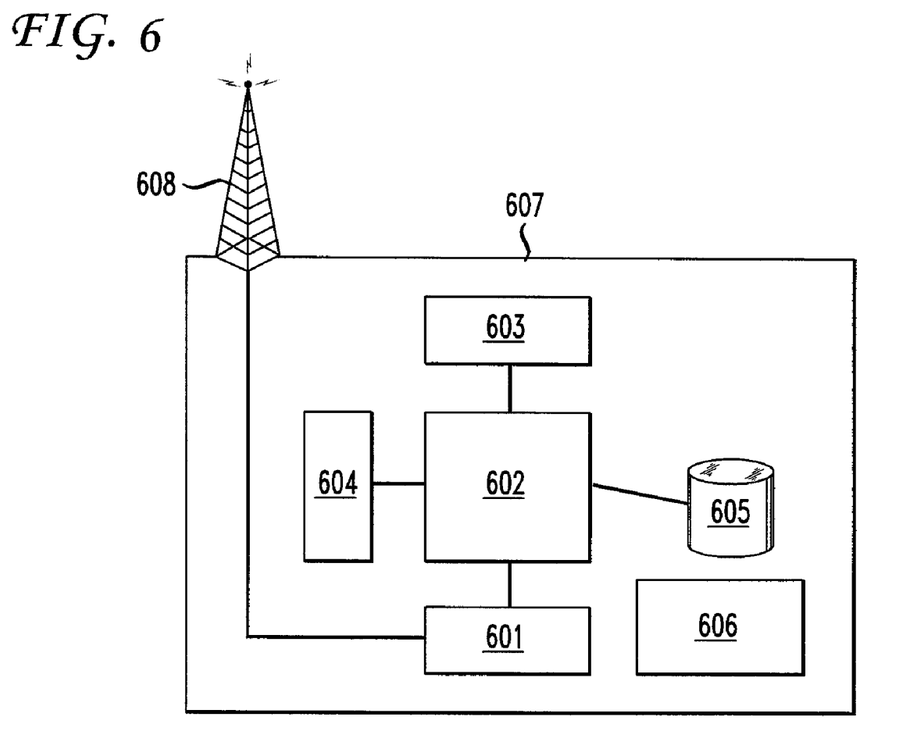
FIG. 6 shows an illustrative network node in accordance with another embodiment of the present invention.

FIG. 6 shows a block diagram of an illustrative network node, such as node in FIGS. 1A and 1B, that is adapted to perform calculations associated with the above medium access control algorithm, including the aforementioned beamforming and power control calculations. Referring to FIG. 6, network node 607 may be implemented on any suitable computer that is adapted to receive store and transmit data such as the aforementioned beamforming and power control data. Illustrative sensor node 607 may have, for example, a processor 602 (or multiple processors) which controls the overall operation of the node 607. Such operation is defined by computer program instructions stored in a memory 603 and executed by processor 602. The memory 603 may be any type of computer readable medium, including without limitation electronic, magnetic, or optical media. Further, while one memory unit 603 is shown in FIG. 6, it is to be understood that memory unit 603 could comprise multiple memory units, with such memory units comprising any type of memory. Network node 607 also comprises illustrative network interface 604 for use in programming the network node and/or to facilitate the use of the sensor node 607 in a wired network application. Network node 607 also illustratively comprises a storage medium, such as a computer hard disk drive 605 for storing, for example, data and computer programs adapted for use in accordance with the principles of the present invention as described hereinabove. One skilled in the art will recognize that, due to the typical compact size of sensor nodes that may comprise network node 607, flash memory may preferably be used in place of hard disk drive 605. Network node 607 also illustratively comprises illustrative amplifier 601 and antenna 608 for transmitting the aforementioned calculations in a wireless network.

Finally, since many applications of sensor networks that may make up such a network node require an independent power source, network node 607 also has battery 606 to power the above components. One skilled in the art will recognize that network node 607 is merely illustrative in nature and that various hardware and software components may be adapted for equally advantageous use in a computer in accordance with the principles of the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for medium access control in a distributed communication network, comprising:
    associating a persistence parameter with a potential link between a transmitting node and a receiving node in the network;
    determining based on said persistence parameter whether the transmitting node participates in contention for a transmission slot;
    if said transmitting node participates in said contention for said transmission slot, computing adaptive transmission parameters for said transmitting node as a function of an invalidity condition and an infeasibility condition; and
    transmitting from said transmitting node in the transmission slot using the computed adaptive transmission parameters if said invalidity condition and said infeasibility condition are met, wherein at least one of i) if the invalidity condition is not met the persistence parameter being updated using a first parameter being a function of the existence of an invalid link and corresponds to $r=r-\beta_1 r^\alpha$ and ii) if the infeasibility condition is not met the persistence parameter being updated using a second parameter weighting the penalty due to an infeasible link and corresponds to $r=r-\beta_2 r^{\alpha-1}$, with r being the persistence parameter, $\beta_1$ being the first parameter, $\beta_2$ being the second parameter, $\alpha$ being a parameter greater than 0.

2. The method of claim 1 wherein the persistence parameter is updated if the transmitting node fails to participate in the contention for the transmission slot.

3. The method of claim 1 wherein the persistence parameter represents a probability of the transmitting node participating in the contention for the transmission slot.

4. The method of claim 1 wherein at least one of said transmitting node and said receiving node comprise multiple antennas and wherein the adaptive transmission parameters include parameters for adaptive beamforming.

5. The method of claim 1 wherein at least one of said transmitting node and said receiving node comprise multiple antennas and wherein the adaptive transmission parameters include parameters for power control.

6. The method of claim 1 wherein at least one of said transmitting node and said receiving node compute the adaptive transmission parameters using an iterative mean square error procedure.

7. Apparatus for medium access control in a distributed communication network, comprising:
  means for associating a persistence parameter with a potential link between a transmitting node and a receiving node in the network;
  means for determining based on said persistence parameter whether the transmitting node participates in contention for a transmission slot;
  means for computing adaptive transmission parameters for said transmitting node if said transmitting node participates in said contention for said transmission slot, said adaptive transmission parameters computed as a function of an invalidity condition and an infeasibility condition; and
  means for transmitting from said transmitting node in the transmission slot using the computed adaptive transmission parameters if said invalidity condition and said infeasibility condition are met, wherein at least one of i) if the invalidity condition is not met the persistence parameter being updated using a first parameter being a function of the existence of an invalid link and corresponds to $r = r - \beta_1 r^\alpha$ and ii) if the infeasibility condition is not met the persistence parameter being updated using a second parameter weighting the penalty due to an infeasible link and corresponds to $r = r - \beta_2 r^{\alpha-1}$, with r being the persistence parameter, $\beta_1$ being the first parameter, $\beta_2$ being the second parameter, $\alpha$ being a parameter greater than 0.

8. The apparatus of claim 7 further comprising means for updating said persistence parameter if the transmitting node fails to participate in the contention for the transmission slot.

9. The apparatus of claim 7 wherein the persistence parameter represents a probability of the transmitting node participating in the contention for the transmission slot.

10. The apparatus of claim 7 wherein at least one of said transmitting node and said receiving node comprise multiple antennas and wherein the adaptive transmission parameters include parameters for adaptive beamforming.

11. The apparatus of claim 7 wherein at least one of said transmitting node and said receiving node comprise multiple antennas and wherein the adaptive transmission parameters include parameters for power control.

12. The apparatus of claim 7 wherein at least one of said transmitting node and said receiving node compute the adaptive transmission parameters using an iterative mean square error procedure.

* * * * *